Patented June 2, 1931

1,808,529

UNITED STATES PATENT OFFICE

ROY E. COLEMAN AND FRANK J. GROTEN, OF MERIDEN, CONNECTICUT, ASSIGNORS, BY MESNE ASSIGNMENTS, TO THE MONOWATT ELECTRIC CORPORATION, OF BRIDGEPORT, CONNECTICUT, A CORPORATION OF CONNECTICUT

MOLDABLE MATERIAL AND PROCESS

No Drawing. Application filed June 28, 1928. Serial No. 289,073.

The present invention relates to moldable materials and processes. It is more particularly directed toward moldable materials and processes, and the resulting products which are suitable for use in the electrical arts. It is, however, not restricted to materials for and processes of making electrical products for it is well suited for employment in many other arts.

The present invention contemplates the provision of a moldable material from which molded articles can be made expeditiously in heated dies or molds to give them their shape, form and finish, so that they may be subsequently cured and hardened if necessary at high temperature out of the molds. According to the present invention the material is suitable for use in the manufacture of molded products, such as used in wiring devices, electrical insulation and in various products not of an electrical nature. These articles are of comparatively high strength, have resistance to shock and acquire a high polish during the molding process.

Another object of the invention is to provide such moldable material from which one can fabricate at a lower cost and by easier manufacturing operations, products having many of the desirable physical properties, such as hardness, resistance to shock, thinness of section, polish, etc., impossible to obtain in cold molded products and now available only in hot molded products at greater cost.

The new moldable materials are capable of being molded in heated dies held under pressure for a few seconds during which time the articles become rigid and assume the shape of the die and acquire a polished surface. The articles are then readily removable from the die or mold and are capable of being cured, if necessary, outside of the die in an oven at comparatively high temperature.

'These moldable materials or the molding composition may be considered as consisting essentially of two principal components, each of which is susceptible of independent variation in its constituents to a very large degree. These two principal components make up substantially the entire mass of the moldable material. Either may include an added or inherent plasticizing agent with or without a volatile solvent, or such plasticizer and/or volatile solvent may be added to the mixed components.

In accordance with the present invention relatively slow hardening binders are used in a novel way to replace part of the fast molding binders in so-called "hot molding" compositions, and as a consequence, new and improved products result. Briefly, the process comprises the following steps: A filler is first coated, impregnated, or otherwise intimately associated with a slow hardening binder and the mixture is subjected to polymerizing or oxidizing conditions to partially harden the binder. The partially hardened product after being comminuted by grinding or any other suitable means, finally is mixed with a proportion of a fast molding compound such as a synthetic resin with or without a filler, and the mixture molded under heat and pressure for a very short time.

One of the principal components, designated for convenience as component A, consists of a filler coated with a binder. Various formulæ may be employed in making up this component. The filler is inert and may include any known inorganic or organic materials, ordinarily used in the art as fillers, such, for example as asbestos fiber, asbestos floats, talc, clay, slate, rotten stone, mica, wood flour or similar materials. The binder or coating on the filler is of the nature of an oil varnish and may comprise drying or semi-drying oils partially hardened by oxidation and oil miscible ingredients of such type as are suitable for forming oil varnishes. The oil may be a drying or semi-drying oil to which is added a drying or hardening agent, such as a metallic drier, or an oil with a vulcanizing agent such as sulphur. These dried or vulcanized oils are in a state of partial solidification and are capable of further hardening during subsequent curing. The materials to be employed are those which are oil soluble as distinguished from water or spirit soluble resins. They may include colorless or light colored varnish gums such as ester gums, East India copal, hardened rosin, or dark materials, such as gilsonite, steam distilled asphalt, blown asphalt, or similar bituminous binders. So far as practicing the present invention is concerned, all these materials are, with the exception of color, equivalents. They all perform the same function and the differences lie only in the degree to which they impart hardness, gloss and body to the product, and as to these properties they appear to operate in the same manner as in oil varnishes.

As illustrative of a particular formula for component A composed of the foregoing materials, one might mention a mixture of gilsonite, steam distilled asphalt, blown asphalt, linseed oil, linoleate of manganese, asbestos and talc. Owing to the bituminous materials, the mixture will be black. These materials may be mixed, treated and prepared in the following manner. The binder for example may consist of fifteen pounds (45.8%) raw linseed oil, two and one-half pounds (7.7%) East India copal, three ounces (0.7%) manganese linoleate and fifteen pounds (45.8%) asphaltic material.

The linseed oil is placed in a tank and copal chips added. The temperature of the tank is increased to, say, 400° F. and held at that temperature for several hours. The mass is agitated while hot. This agitating and heating serves to substantially dissolve and disperse the resinous material in the oil and bodies the oil. The temperature may then be decreased, to, say, 300° F. and a small quantity of drier such as manganese linoleate may be added. After maintaining the latter temperature for some hours, the temperature may then be again raised to, say, 380° F. and an asphaltic substance such as blown asphalt, steam distilled asphalt or gilsonite, added. This temperature is maintained for several hours, during which time the asphalt is melted and dispersed throughout the mixture.

The filling material of component A in this illustrative example may consist of asbestos floats or other fillers such as talc, clay, etc.

About thirty pounds of this filler is put into a double arm dough mixer, and the mixer started. From four to seven pounds (depending upon the nature of the filler) of the above described binder is now sprayed onto the filler in the revolving mixer, and allowed to mix for several hours, until the particles are thoroughly coated. The material is then heated in a steam oven for a variable length of time (8 to 24 hours) to partially oxidize the oil. It may thus consist of from 81.2% to 88.3% filler, 5.4% to 8.6% drying oil, 5.4% to 8.6% asphaltic material, 1% to 1.5% copal, 0.1% to 0.13% drier. It will of course be understood that larger quantities of the various ingredients will be used in making this component in manufacturing operations.

Where one desires a molded product of a color other than black, it is necessary to avoid the bituminous binders, employing instead a binder consisting of heat treated linseed oil or China wood oil, together with a varnish resin such as an ester gun, copal, hardened rosin or similar oil soluble varnish gum.

The other principal component, designated for convenience as component B is also a powder and consists essentially of a synthetic resin or resins, such as phenol formaldehyde, phenol furfurol, or resins having somewhat similar properties, and capable of hardening under heat; that is, resins of the heat convertible type. They are generally employed with an inert filler such as wood flour, asbestos, talc or similar filler. These ingredients are each in the form of dry powders and are separately available, or may be purchased ready mixed according to a number of formulae. These resins are variably soluble in voltatile solvents such as benzol, alcohol, toluol, acetone, furfurol, etc., and have the property of being converted into an infusible state by heat and pressure.

As illustrative of the preparation of a batch of the moldable material of the new type from these powders with or without the plasticizer, one may mix the parts in varying proportions according to the particular composition of the components employed, and the nature of the article being made. Thus we may have variations from 45% to 95% of component A and from 5% to 55% of component B in which component B consists of synthetic resin and contains 0 to 60% of wood flour or asbestos flour or the like.

As an example of a formula for the making of devices having an intricate design or where maximum flowing properties are required, one may employ a mixture consisting of 51% of component A, 49% of component B (the latter being composed of 40% synthetic resin, 53% wood flour and 7% of long asbestos fiber, and in the neighborhood of 1½% of plasticizing agent. Where colored products are to be produced, a suitable dye is added.

As an example of moldable material where high heat resistance is essential, one may use a combination employing 94% of component A and 6% of component B, with component B containing synthetic resin only, to which compound is added the desired coloring matter and 1½% of plasticizer.

These ingredients are placed in a double arm mixer and thoroughly mixed so as to incorporate and distribute the color and plasticizer. Component A is placed in a double dough mixer. If component B contains a filler such as wood flour or asbestos, this filler is preferably mixed with component A, and to this mixture the synthetic resin portion of component B is finally mixed in. After this is completely mixed, the plasticizer is added and the resultant mixture is then more thoroughly mixed and compounded by mixing it on hot rolls, similiar to those used for compounding rubber. This acts to soften the synthetic resin, thoroughly mixes the ingredients, evaporates out the volatile solvent, if one has been used, and may cause a partial curing of the synthetic resin. After the material has been rolled sufficiently, to thoroughly mix in the ingredients, it is scraped off the rolls and is allowed to cool and then ground.

It is understood in carrying out these processes that when component B consists of a filler in addition to the synthetic resin, the resin and this filler can be mixed together prior to admixture with component A, also that the plasticizing agents may be added to the synthetic resin prior to its admixture either with the filler of component B or the mixture of component A with component B fillers. Various other orders of mixing may be employed.

The plasticizer or plasticizers used may work on the separate components. One can use a different plasticizer for A and for B or the same one or a variety in each case. The plasticizers employed should, however, be mutually soluble.

Any of the above methods may be employed in providing molding powder suitable for molding in hot molds. The powder may be used either as a powder or in pellet or pre-molded form. The powder or pellet is placed in the mold cavities in steam heated molds maintained at a temperature corresponding to 25 to 160 pounds per square inch of steam pressure. The material under the influence of heat and pressure molds to the shape of the die and partially hardens in a very short time. It also assumes a high degree of polish and within a few seconds becomes sufficiently rigid to be capable of being removed from the dies. The material is capable of being molded with or without inserted metal parts, and in comparatively thin sections. The article is then taken out of the die and transferred to an oven where it is baked beginning at a temperature of 150° F. and gradually increased to 400° F. The baking period may vary from 8 to 40 hours depending on the character of the piece. In some cases it may not be necessary to bake the articles after removal from the mold, in which case the baking step is, of course, omitted.

The majority of pieces can be molded in a very few seconds and in those pieces where longer periods are required due to the intricate design the time for molding is reduced at least 50% below that required by existing methods. The finished article has an inherent polish or finish, where polished molds are used, which makes it unnecessary to subsequently polish by buffing.

While it is entirely feasible to perform this molding in multiple impression dies, their use is not so necessary to obtain production. Owing to the short cycle of operations in the dies, single or double impression dies permit large production. The feature very materially reduces the cost of manufacture of the molded articles as it is not necessary to carry such a large investment in molds and dies, as is the case in hot molding processes as now employed.

From the foregoing it will be evident that a moldable material and molded product have been provided which cost much less than where straight hot moldable material is used. Not only is a high percentage of cheaper material used, but great strength, high polish and resistance to shock, are available. Labor cost and investment are both considerably lower.

We claim:

1. A molding composition comprising an intimate mixture of unlike molding plastics one of which includes a heat convertible resin and the other of which consists of an inert filler coated with a partially oxidized binder comprising a drying oil and oil varnish ingredients miscible therewith.

2. A molding composition consisting of an intimate mixture of unlike molding plastics one of which includes a heat convertible synthetic resin and a filler, the other of which consists of an inert filler coated with partially oxidized non-fusible binder comprising a drying oil.

3. A molding composition comprising an intimate mixture of unlike molding plastics one of which includes a heat convertible synthetic resin, the other of which consists of an inert filler coated with a partially oxidized binder comprising a drying oil, there being from 5 to 55% of the first mentioned plastic and from 45 to 95% of the second plastic in the mixture.

4. A molding composition comprising an intimate mixture of unlike molding plastics one of which includes a heat convertible synthetic resin, the other of which includes an inert filler coated with a binder consisting of a partially oxidized drying oil and oil varnish ingredients miscible therewith, there being from 5 to 55% of the first mentioned plastic and 45 to 95% of the second plastic in the mixture.

5. A molding composition comprising a filler coated with a partially oxidized drying oil and a heat convertible phenolic resin intimately associated therewith.

6. A hot molding composition comprising an intimate mixture of a filler coated with a binder consisting of a drying oil and oil varnish ingredients miscible therewith, and a phenolic molding resin which is heat convertible to the infusible state.

7. A molded article comprising a synthetic resin rendered infusible by heat and pressure and an inert filler coated with an oxidized oil of the drying or semi-drying type.

8. A molded article comprising a heat convertible phenolic resin rendered infusible under heat and pressure, and an inert filler coated with an oxidized binder comprising a drying oil and oil varnish ingredients miscible therewith.

9. The process of making a moldable composition which comprises coating an inert filler with a drying oil, oxidizing the material to partially solidify the drying oil and intimately mixing the so prepared material with a synthetic resin capable of hardening under heat and pressure.

10. The process of making a moldable composition which comprises coating an inert filler with a drying oil and oil varnish ingredients miscible therewith, partially oxidizing the oil to partially harden it and intimately mixing the so prepared material with a heat convertible synthetic resin.

11. The process of making a moldable composition which comprises coating a filler with a drying oil, then oxidizing said drying oil to partially harden it, and intimately mixing the so prepared material with a mixture of a heat convertible synthetic resin and an uncoated filler.

12. The process of preparing a molding composition which comprises mixing a filler with a drying oil in a partially oxidized state, causing said oil to be converted to an infusible state, comminuting the resulting product and then mixing a heat convertible phenolic resin with the comminuted product.

13. The process of preparing a molded article which comprises mixing a filler with a binder comprising a liquid drying oil and oil varnish ingredients miscible therewith, heating said mixture under oxidizing conditions to cause said binder to be converted to a non-fusible state and comminuting said product, mixing a heat convertible phenolic resin therewith, and molding said mixture.

14. The process of preparing a molded article which comprises mixing a filler with a binder comprising partially oxidized Chinawood oil, heating said mixture under oxidizing conditions to cause said binder to be converted to a non-fusible state, intimately mixing therewith a heat convertible phenolic resin, and molding said mixture under heat and pressure.

15. The process of preparing a molded article which comprises mixing a filler with a binder comprising partially oxidized Chinawood oil, oxidizing said binder to a non-fusible state, intimately mixing therewith a heat convertible phenolic resin, and molding said mixture under heat and pressure.

Signed at Meriden, in the county of New Haven and State of Connecticut, this 22nd day of June, 1928.

ROY E. COLEMAN.
FRANK J. GROTEN.